United States Patent Office 3,000,888
Patented Sept. 19, 1961

3,000,888
PROCESS FOR THE PRODUCTION OF AMINO ACIDS
Ernst Biekert, Munich, Germany, assignor, by mesne assignments, to Hoffmann-La Roche Inc., Nutley, N.J., a corporation of New Jersey
No Drawing. Filed Oct. 1, 1958, Ser. No. 764,532
Claims priority, application Germany Oct. 17, 1957
10 Claims. (Cl. 260—247.2)

Unsuccessful experiments led C. Mannich and M. Bauroth (Arch. Pharm. 262, 241, 1924) to the conclusion that the condensation of 1-phenyl-2,3-dimethyl-5-pyrazolone with glyoxylic acid and secondary amines would not permit the production of any α-amino acid. Rather, instead of the expected phenyl-dimethyl-pyrazolonyl dimethyl amino acetic acid, there was exclusively produced the bis-(phenyl-dimethyl-pyrazolonyl) acetic acid.

The surprising observation has now been made that the unsuccessfully attempted production by Mannich and Bauroth of these N-disubstituted α-amino acids and further N-disubstituted α-amino acids of the same kind can readily succeed if glyoxylic acid is first reacted with a secondary amine and then with a CH-acid compound at a pH value of 3–5.

It is not necessary to add the glyoxylic acid used for the reaction as such. It is suitable to use them in the form of its derivatives such as the hydrates, acetals, salts, esters, or bisulphite compounds. While the hydrates and acetals, for example, react as glyoxylic acid under the conditions of the reaction, the other derivatives can be transformed into glyoxylic acid readily by the methods known as such.

As secondary amines all those can be used of which it is known that they yield so-called Mannich compounds with formaldehyde and CH acid compounds. For example, dimethyl-amine, piperidine, morpholine and dibenzyl amine are suitable.

In a comparable way, the CH-active compounds may be reacted to produce N-disubstituted amino acids, which latter compounds can be amino-methylated with formaldehyde and secondary bases.

As especially suitable, for example, phenols with free ortho or para positions to the hydroxy-group, indole derivatives with free β-positions and 1-phenyl-2,3-dimethyl-5-pyrazolone have been found.

The substances obtainable according to the new process are to be used as therapeutic agents and as intermediate products for the manufacture of therapeutic agents.

EXAMPLE 1

*1-phenyl-2,3-dimethyl-5-pyrazolonyl-(4)-morpholine-acetic acid*

5 g. of finely ground barium glyoxylate are slurried in 70 ml. of alcohol and treated with 21 ml. of normal sulphuric acid with stirring. Stirring is continued for 1 hour and tested after filtration for freedom from $SO_4$.

The alcoholic glyoxylic solution is cooled in an ice bath. With stirring and cooling by ice 3.7 g. (42 millimol) of morpholine dissolved in 20 ml. of alcohol are dropped in. This ice-cold mixture is added dropwise to a solution of 3.95 g. of 1-phenyl-2,3-dimethyl-5-pyrazolone (21 millimol) in 30 ml. of alcohol which has previously been acidified to a pH value of 4 to 5. By spot tests on moist indicator paper and dropwise addition of 2 N hydrochloric acid the pH during the reaction is maintained at 3.5.

The mixture is then boiled under reflux for 1 hour and the solvent evaporated on the water bath under reduced pressure. The residue is taken up in 100 ml. of water and to remove the glyoxylic acid it is again considerably concentrated under vacuum.

The excess amine is separated by chromatography over an anion exchanger (polystyrene dimethyl ethanol benzyl ammonium, sold under the trade name of Dowex 2, by the Dow Chemical Company of Midland, Mich.); by elution with boiled distilled water the unreacted amine is washed out of the column. The filtrate is titrated with normal sulphuric acid and the reaction point thus determined. The amino acid is then washed out of the column by elution with 2 N hydrochloric acid and the filtrate is dried on the water bath under reduced pressure. As residue there remains the amino acid hydrochloride which is dried in vacuum over phosphorus pentoxide and caustic potash and recrystallised from methanol. White needles of decomposition point 208° C. Yield by chromatography 50–60%, by recrystallisation 40%.

$C_{17}H_{22}O_4N_3Cl$ (367.8) calc.: C, 55.51; H, 6.03; N, 11.42. Found: C, 55.60; H, 6.10; N, 10.70.

To isolate the free amino acid from the hydrochloride, the aqueous solution of the hydrochloride is subjected to chromatography over a cation exchanger (polystyrene nuclear sulfonic acid, sold under the trade name of Dowex 50, by the Dow Chemical Company of Midland, Mich.). By elution with 2 N ammonia, amino acid is washed from the column as the ammonium salt. By repeated evaporation of the filtrate with water under reduced pressure the ammonia is removed and the free amino acid obtained. For analysis it is recrystallised from methanol to white crystals of decomposition point 213° C.

$C_{17}H_{21}O_4N_3 \cdot \frac{1}{2}H_2O$ (340.4) calc.: C, 59.98; H, 6.51; N, 12.35. Found: C, 59.90; H, 6.93; N, 11.92.

EXAMPLE 2

*1-phenyl-2,3-dimethyl-5-pyrazolonyl-(4)-dimethyl-amino-acetic acid*

To a solution prepared as in Example 1 of 30 millimols of glyoxylic acid in 100 ml. of alcohol, 60 millimols of dimethyl amine in alcohol solution are dropped in with stirring and ice cooling. The cold mixture is added dropwise slowly at room temperature into a solution of 5.65 g. of 1-phenyl-2,3-dimethyl-5-pyrazolone (30 millimols) in 50 ml. of alcohol which have previously been acidified to a pH value of 4.5. By spot tests on moist pH paper and dropwise addition of 2 N hydrochloric acid, the pH value is maintained at about 5. The mixture is thereafter boiled for 1 hour under reflux and the solvent evaporated.

The residue is dissolved in 50 ml. of water and subjected to chromatography over Dowex 2. In the filtrate 30.47 millimols of free amine are back-titrated. The acid elution product is brought to dryness on the water bath in vacuum taken up with water and again evaporated down.

The residue is taken up in 50 ml. of water and subjected to chromatography over Dowex 50. The elution product is dried in vacuum with 2 N ammonia then treated twice with water and again evaporated down in vacuum. The remaining amino acid after drying in vacuum over phosphorus pentoxide and caustic potash is a strongly hygroscopic resinous mass.

The free acid is dissolved in alcohol, treated with the equivalent quantity of normal sulphuric acid and carefully precipitated with ether. White crystals separate of the amino acid hydrosulphate. For analysis it is recrystallized twice from alcohol to which a small quantity of water has been added. Melting point 182° C. with decomposition.

$C_{15}H_{20}O_3N_3 \cdot HSO_4$  $C_{15}H_{21}O_7N_3S$ (387.4) calc.: C, 46.50; H, 5.46; N, 10.85. Found: C, 46.29; H, 5.50; N, 10.15.

EXAMPLE 3

*1-phenyl-2,3-dimethyl - 5 - pyrazolonyl-(4)-diethylaminoacetic acid*

In the manner described in Examples 1 and 2, 13.5 millimols of calcium glyoxalate are reacted in 80 ml. of alcohol with 27 millimols of normal sulphuric acid, filtered off, and the alcoholic glyoxylic acid solution added dropwise with ice cooling to a solution of 4 g. of diethylamine (54 millimol) in 20 ml. of alcohol.

This solution is added at room temperature in drops to a solution of 5 g. of 1-phenyl-2,3-dimethyl-5-pyrazolone (27 millimols) the pH value being maintained at about 4 by the addition of 2 N hydrochloric acid. The mixture is then heated for 1 hour under reflux and allowed to stand for 12 hours at room temperature. The solution is concentrated in vacuum to about 10 ml. and as described, subjected to chromatography over Dowex 2. By titration a conversion of 37% is determined.

The thus obtained glassy hydrochloride is subjected to chromatography over Dowex 50, the free amino acid taken up in methanol and considerably reduced in volume. After several days, crystallization sets in. After taking up in hot chloroform and treatment with acetic ester a yellow oil separates out which slowly crystallises. Dense white crystal druses then separate which are recrystallized twice from chloroform. Melting point 118° C., decomposition commences 120–125° C.

$C_{17}H_{23}O_3N_3$ (317.4) calc.: C, 64.33; H, 7.35; N, 13.24. Found: C, 63.65; H, 7.85; N, 13.24.

EXAMPLE 4

*β-indolyl-morpholine acetic acid*

The preparation of the glyoxylic acid solution and its reaction with morpholine proceeds as in Examples 1–3.

By adding the cold alcoholic solution dropwise to the alcoholic indole solution a greenish yellow colouration occurs. After two hours boiling under reflux the solution is an intense yellow. The solvent is distilled off under nitrogen in the cold whereby a pale red precipitate separates which becomes dark red under the influence of light.

The precipitate is filtered off and separated as usual over Dowex 2 with exclusion of light. By titration a conversion of about 35% is indicated. The acid fractions are brought to dryness under nitrogen, the residue taken up in water filtered from insoluble matter and subjected to chromatography over Dowex 50. The free amino acid can be purified by transformation into its free hygroscopic crystalline hydrochloride with a decomposition point of 130–140° C.

This was again subjected to chromatography over Dowex 50 to give the free amino acid; white crystals of a melting point of 212–215° C. with decomposition.

For analysis, purification is carried out as follows: amino acid is dissolved in much methanol by boiling under reflux, filtered hot and considerably concentrated. Sudden crystallization sets in the hot; decomposition point 213–214° C. (with rapid heating).

$C_{14}H_{16}O_3N_2 \cdot \frac{1}{2}H_2O$ (269.3) calc.: C, 62.44; H, 6.36; N, 10.40. Found: C, 62.85; H, 6.55; N, 10.21.

EXAMPLE 5

*(3-methoxy-4-hydroxyphenyl)-morpholine-acetic acid*

In a solution prepared as usual of 15 millimols of glyoxylic acid in 50 ml. of alcohol there are added dropwise with stirring and ice cooling 2.61 g. of morpholine (30 millimols) dissolved in 15 ml. of alcohol. This solution is introduced dropwise with stirring into a solution of 1.86 g. of guaiacol (15 millimols). By spot tests on pH paper and dropwise addition of 2 N hydrochloric acid the pH is maintained at 4–5. The mixture is then boiled under reflux for one hour. Solvent is withdrawn in vacuum, the residue again treated with water and again brought to dryness. It is taken up in 150 ml. of water and acidified to a pH value of 1. The solution is shaken out three times with 50 ml. portions of chloroform to separate the unreacted guaiacol and is then evaporated in vacuum on the water bath. The residue is dissolved in 70 ml. of water and subjected to chromatography over Dowex 2. A conversion of 22% is thereby indicated.

The united acid elution products are brought to dryness. The amino acid hydrochloride remains as a brownish resin which is extremely hygroscopic.

The hydrochloride is dissolved in water and the acid portions separated over Dowex 50. The eluate is taken up with 2N ammonia evaporated down, treated with water and again evaporated down. The free amino acid is a brownish extremely hyrogrospic resin.

In the same way, by using dimethyl amine in place of morpholine, there can be produced the (3-methoxy-4-hydrophenyl)-dimethyl-amino acetic acid hydrochloride. The yield amounts to 24%. The amino acid hydrochloride is a yellowish resin.

EXAMPLE 6

*(2,6-dimethyl - 4 - hydroxyphenyl)-morpholine-acetic acid hydrochloride*

An alcoholic glyoxylic acid solution prepared as usual which contains 17.2 millimols of glyoxylic acid in 50 ml. of alcohol is treated dropwise with stirring and ice cooling with a solution of 3 g. of morpholine (34.5 millimols) in 20 ml. of alcohol. The cold mixture is dropped at room temperature with stirring, into an alcohol solution of 2.1 g. of xylenol-3,5 (17.2 millimols) whereby by spot tests on moist pH paper and dropwise addition of 2 N hydrochloric acid the pH value is held at 4.

The mixture is then boiled under reflux for 1 hour and the solvent withdrawn. The residue is taken up in 100 ml. of water and again brought to dryness. 100 ml. of water are then added and the mixture acidified to pH 1 is shaken out three times with 50 ml. portions of benzene. The aqueous phase is evaporated to dryness in vacuum, dissolved in a little water and the basic components removed over Dowex 8. By titration a conversion of 35% is indicated.

The united elution products taken up with 2 N hydrochloric acid are evaporated down and the residue dried in vacuum over phosphorus pentoxide and caustic potash. The amino acid hydrochloride is an almost white resinous very hygroscopic mass. Dowex 2 and Dowex 50 are the trade names for a series of proprietary synthetic ion-exchange resins obtainable from the Dow Chemical Company, Midland, Mich.

I claim:

1. Process for the production of α-amino acids, which comprises reacting in a first stage glyoxylic acid with a secondary amine under ice-cooling, thereafter in a second stage reacting the reaction mixture with a cyclic compound containing active hydrogen at a pH of from 3–5, and recovering the α-amino acid thereby formed.

2. Process according to claim 1, in which said cyclic compound containing active hydrogen is a member selected from the group consisting of phenols having a free ortho-position with respect to the hydroxy group, phenols having a free paraposition with respect to the hydroxy group, compounds containing the indole nucleus and having a free β-position and 1-phenol-2,3-dimethyl-5-pyrazolone.

3. Process according to claim 1, in which the secondary amine is a member selected from the group consisting of dimethylamine, piperidine, morpholine and dibenzylamine.

4. Process for the production of 1-phenyl-2,3-dimethyl-5-pyrazolonyl-(4)-morpholine-acetic acid, which comprises reacting in a first stage under ice-cooling glyoxylic acid and morpholine, thereafter in a second stage reacting the reaction mixture with 1-phenyl-2,3-dimethyl-5-pyrazolone at a pH of from 3–5, and recovering the 1-phenyl-2,3-dimethyl-5-pyrazolonyl-(4)-morpholine acetic acid thereby formed.

5. Process for the production of 1-phenyl-2,3-dimethyl-5-pyrazolonyl-(4)-dimethyl-amino-acetic acid, which comprises reacting in a first stage under ice-cooling glyoxylic acid with dimethylamine, thereafter in a second stage reacting the reaction mixture with 1-phenyl-2,3-dimethyl-5-pyrazolone at a pH of from 3–5, and recovering the 1-phenyl-2,3-dimethyl-5-pyrazolonyl-(4)-dimethyl-aminoacetic acid thereby formed.

6. Process for the production of 1-phenyl-2,3-dimethyl-pyrazolonyl-(4)-diethylamino-acetic acid, which comprises reacting in a first stage under ice-cooling glyoxylic acid with diethylamine, thereafter in a second stage reacting the reaction mixture with 1-phenyl-2,3-dimethyl-5-pyrazolone at a pH of from 3–5, and recovering the 1-phenyl - 2,3 - dimethyl 5 - pyrazolonyl - (4) - diethyl-amino-acetic acid thereby formed.

7. Process for the production of β-indolyl-morpholine-acetic acid, which comprises reacting in a first stage under ice-cooling glyoxylic acid with morpholine, thereafter in a second stage reacting the reaction mixture with indole at a pH of from 3–5, and recovering the β-indolyl-morpholine-acetic acid thereby formed.

8. Process for the production of (3-methoxy-4-hydroxyphenyl)-morpholine-acetic acid, which comprises reacting in a first stage under ice-cooling glyoxylic acid with morpholine, thereafter in a second stage reacting the reaction mixture with guaiacol at a pH of from 3–5, and recovering the (3-methoxy-4-hydroxyphenyl)-morpholine-acetic acid thereby formed.

9. Process for the production of (3-methoxy-4-hydroxyphenyl)-dimethylamino-acetic acid, which comprises reacting in a first stage under ice-cooling glyoxylic acid and dimethylamine, thereafter in a second stage reacting the reaction mixture with guaiacol at a pH of from 3–5, and recovering the (3-methoxy-4-hydroxyphenyl)-dimethylamino-acetic acid thereby formed.

10. Process for the production of (2,6-dimethyl-4-hydroxyphenyl)-morpholine-acetic acid, which comprises reacting in a first stage under ice-cooling glyoxylic acid and morpholine, thereafter in a second stage reacting the reaction mixture with xylenol-3,5 at a pH of from 3–5, and recovering the (2,6-dimethyl-4-hydroxyphenyl)-morpholine-acetic acid thereby formed.

References Cited in the file of this patent
UNITED STATES PATENTS
2,861,993    Schlichting et al. -------- Nov. 25, 1958

OTHER REFERENCES

Adams: Organic Reactions, vol. I, pp. 303 and 307 (1942), N.Y., John Wiley and Sons, Inc.

Hellman et al.: Chem. Ber., vol. 89, pp. 81 to 90 (1956).

Julia et al.: Bull. Soc. Chim., vol. 22, pp. 830 to 833 (1955).

Mannich et al.: Arch. Pharm., vol. 262, p. 241 (1924).